(12) United States Patent
Doerr

(10) Patent No.: US 7,181,104 B2
(45) Date of Patent: Feb. 20, 2007

(54) OPTICAL MONITOR AND A METHOD FOR IMPROVED OPTICAL MONITORING

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 154 days.

(21) Appl. No.: 10/657,863

(22) Filed: Sep. 9, 2003

(65) Prior Publication Data
US 2005/0053328 A1 Mar. 10, 2005

(51) Int. Cl.
G02B 6/26 (2006.01)
(52) U.S. Cl. .......................... 385/27; 385/15
(58) Field of Classification Search ............. 385/27, 385/15
See application file for complete search history.

(56) References Cited

U.S. PATENT DOCUMENTS

| | | | | |
|---|---|---|---|---|
| 5,233,453 A * | 8/1993 | Sivarajan et al. | ............. | 398/55 |
| 5,812,567 A * | 9/1998 | Jeon et al. | ............. | 372/6 |
| 6,330,255 B1 * | 12/2001 | Hung | ............. | 372/20 |
| 6,747,793 B1 * | 6/2004 | Flanders | ............. | 359/344 |
| 7,006,730 B2 * | 2/2006 | Doerr | ............. | 385/37 |

OTHER PUBLICATIONS

C. R. Doerr et al., "Cross-Connect-Type Wavelength Add-Drop Node With Integrated Band Muxes, Interleavers, and Monitor", Opt. Fib. Conf., Mar. 23, 2003.
C. R. Doerr et al., "Integrated Band Demultiplexer Using Waveguide Grating Routers", IEEE Photonics Technology Letters, vol. 15, No. 8, Aug. 2003.

* cited by examiner

*Primary Examiner*—Jennifer Doan

(57) ABSTRACT

The inventor proposes herein a novel optical monitor requiring only a single fiber-coupled photodetector. In one embodiment of the present invention, the optical monitor further includes an optical coupler for tapping a portion of an optical signal, a tunable filter for filtering the tapped optical signal at a predetermined frequency, and a Faraday rotator mirror for removing any polarization dependence of the tapped optical signal and for reflecting the filtered optical signal back through the tunable filter and the coupler. Subsequently, the photodetector of the optical monitor measures the power of the filtered optical signal. The optical spectrum of the optical signal is thus measured by scanning the tunable filter across the band of the optical signal and measuring the power of the optical signal as a function of the optical frequency of the tunable filter.

17 Claims, 5 Drawing Sheets

OPTICAL MONITOR AND A METHOD FOR IMPROVED OPTICAL MONITORING

CROSS-REFERENCE TO RELATED APPLICATIONS

This patent application is related to U.S. patent application Ser. No. 10/378,411 entitled "Low-Loss Integrated Optical Coupler and Optical Switch" filed Mar. 3, 2003, which is herein incorporated by reference in its entirety.

FIELD OF THE INVENTION

This invention relates to the field of Wavelength Division Multiplexing (WDM) systems and, more specifically, to an optical signal monitor for use with such systems.

BACKGROUND OF THE INVENTION

Progress in WDM networks is placing new requirements for optical monitoring of system performance and channel characteristics. Conventional grating spectrometers, wavemeters and scanning Fabry-Perot filters have been proposed for optical monitoring, but often are unsuitable because of cost, size, performance or reliability.

SUMMARY OF THE INVENTION

The present invention advantageously provides a novel optical monitor requiring only a single fiber-coupled photodetector.

In one embodiment of the present invention, an optical monitor includes an optical coupler for tapping a portion of an optical signal, a tunable filter for filtering the tapped optical signal at a predetermined frequency, a Faraday rotator mirror for removing any polarization dependence of the tapped optical signal and for reflecting the filtered optical signal back through the tunable filter, and a single photodetector, for measuring the power of the filtered optical signal. To measure the optical spectrum of the optical signal, the tunable filter is scanned across the band of the optical signal and the power measured by the photodetector is recorded as a function of optical frequency of the tunable filter.

In an alternate embodiment of the present invention, a method of optical monitoring includes a) tapping an optical signal, b) filtering the tapped optical signal at a predetermined frequency, c) eliminating the polarization dependence of the tapped optical signal, d) filtering again, the filtered optical signal, e) determining the power of the filtered optical signal, and f) repeating steps b) through e) for each frequency throughout the band of the optical signal to determine an optical spectrum of the optical signal.

BRIEF DESCRIPTION OF THE DRAWINGS

The teachings of the present invention can be readily understood by considering the following detailed description in conjunction with the accompanying drawings, in which:

FIG. 2a depicts a high level block diagram of an embodiment of a scanning tunable filter suitable for use in the optical monitor of FIG. 1;

FIG. 2b graphically depicts the principle of operation of the tunable filter of FIG. 2a;

To facilitate understanding, identical reference numerals have been used, where possible, to designate identical elements that are common to the figures.

DETAILED DESCRIPTION OF THE INVENTION

Figure 1:
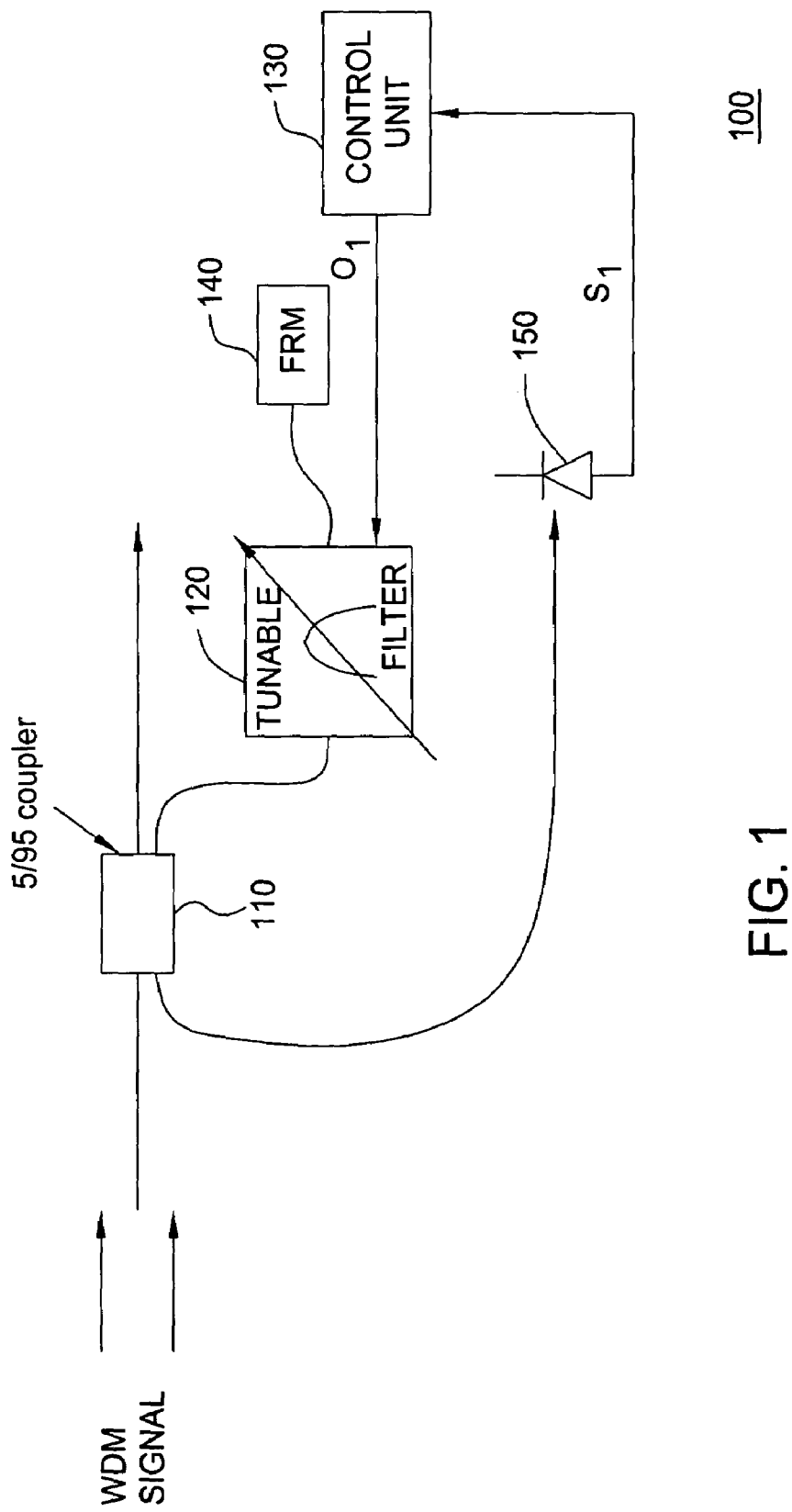
FIG. 1 depicts a high level block diagram of an embodiment of a novel optical monitor in accordance with the present invention.

FIG. 1 depicts a high level block diagram of an embodiment of a novel optical monitor in accordance with the present invention. The optical monitor 100 of FIG. 1 illustratively comprises an optical coupler (illustratively a 5/95 optical coupler) 110, a scanning tunable filter 120, a control unit 130, a mirror (illustratively a Faraday rotator mirror (FRM)) 140 and a photodetector 150. Although in FIG. 1, the optical coupler 110 is illustratively depicted as a 5/95 optical coupler, optical couplers with various other splitting ratios (e.g., 1/99) may also be implemented within an optical monitor in accordance with the present invention. Furthermore, although in FIG. 1, the mirror 140 is illustratively depicted as a Faraday rotator mirror, if the polarization sensitivity of the tunable filter is sufficiently low, the FRM may be replaced by a plain mirror. Furthermore, other means of directing (reflecting) light, such as a Sagnac loop, may be implemented in place of the mirror in a novel optical monitor in accordance with the present invention. Even further, other means of substantially eliminating the polarization sensitivity of an optical signal, such as a quarter-wave plate, may be implemented in place of the FRM in a novel optical monitor in accordance with the present invention. Although in FIG. 1, the control unit 130 is depicted as being an included component of the optical monitor 100 in accordance with the present invention, a control unit (such as a computer) may be provided by a user and as such the control unit would not be an included component of an optical monitor of the present invention.

Figure 2:
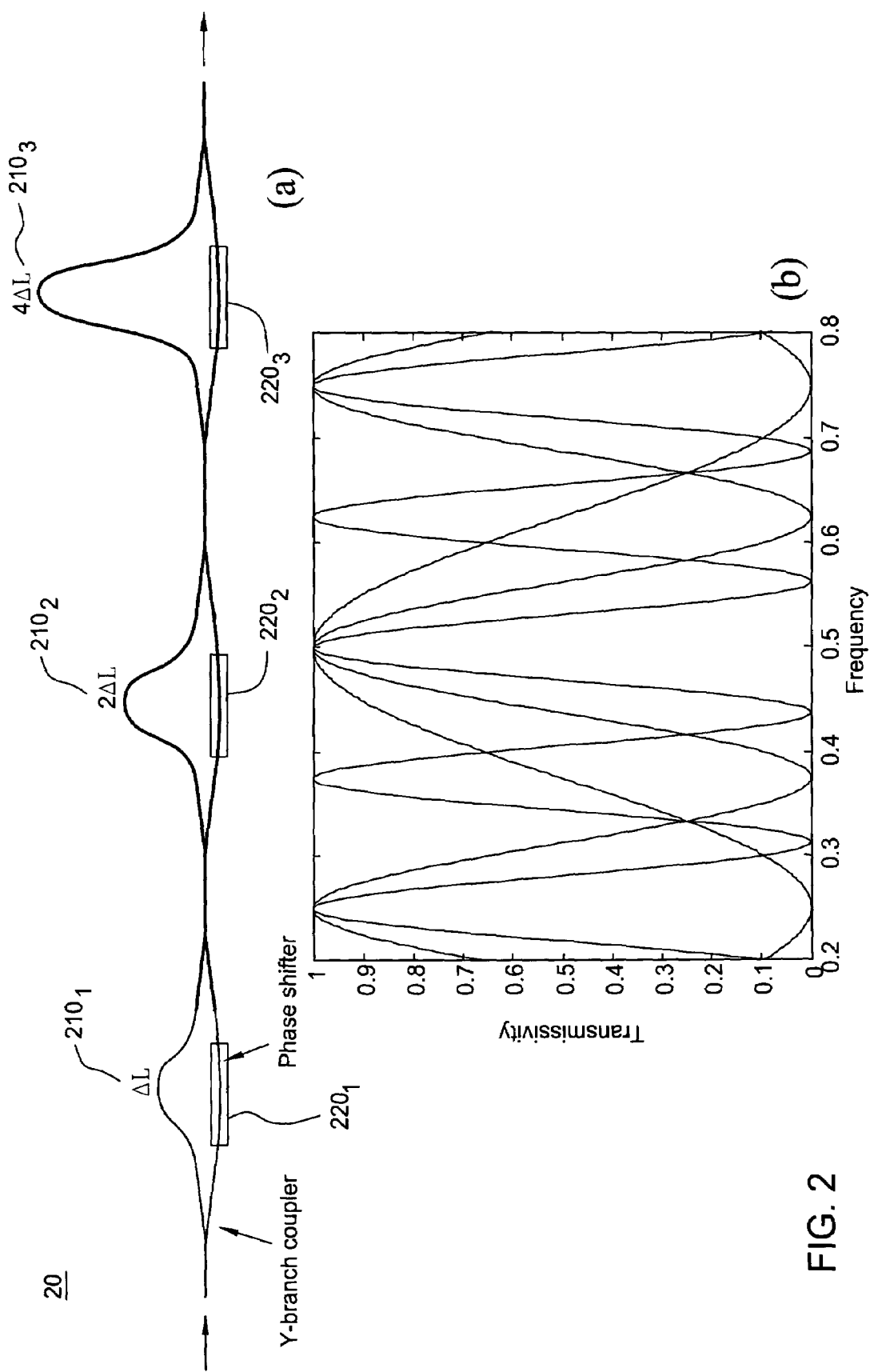

FIG. 2a depicts a high level block diagram of an embodiment of a scanning tunable filter suitable for use in the optical monitor 100 of FIG. 1. The scanning tunable filter 120 of FIG. 2a illustratively comprises three coupled thermooptically-tuned Mach-Zehnder Interferometer (MZI) filters $210_1$–$210_3$ (collectively MZI filters 210). Each of the MZI filters illustratively comprise a phase shifter $220_1$–$220_3$ for providing tuning capability to the tunable filter 120. The MZI filters 210 have an exponential distribution of free-spectral range from 200 to 12800 GHz. When the filter 120 is tuned to a particular optical frequency, the peaks of all transmissivity spectra of all of the MZI filters 210 are aligned at that frequency, as depicted in FIG. 2b.

FIG. 2b graphically depicts the principle of operation of the tunable filter 120 of FIG. 2a. In FIG. 2b, the transmissivity of the filter 120 is graphed as a function of frequency. As previously noted and evident from FIG. 2b, when the filter 120 is tuned to a particular optical frequency, the peaks of all transmissivity spectra of all of the MZI filters 210 are aligned at that frequency. Although in FIG. 2a, the tunable filter 200 is illustrated as comprising three MZI filters, various other numbers of MZI filters may also be implemented within a tunable filter in accordance with the present invention.

Figure 3:
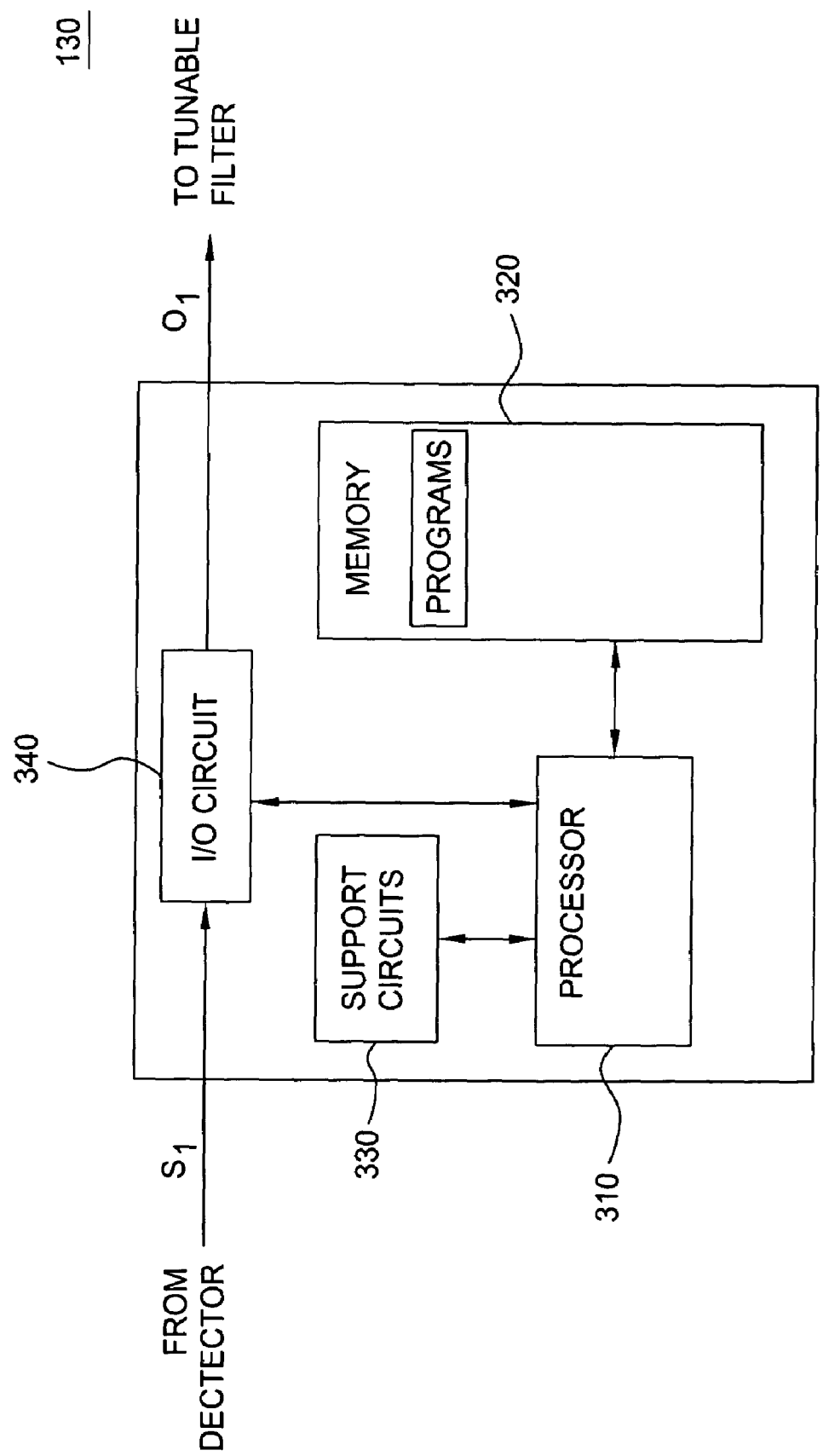
FIG. 3 depicts a high level block diagram of an embodiment of a control unit suitable for use in the optical monitor of FIG. 1.

FIG. 3 depicts a high level block diagram of an embodiment of a control unit suitable for use with the optical monitor 100 of FIG. 1. The control unit 130 of FIG. 3 illustratively comprises a processor 310 as well as a memory 320 for storing information and control programs. The processor 310 cooperates with conventional support circuitry 330 such as power supplies, clock circuits, cache memory and the like as well as circuits that assist in executing the software routines stored in the memory 320. As such, it is contemplated that some of the process steps discussed herein as software processes may be implemented within hardware, for example, as circuitry that cooperates with the processor 310 to perform various steps. The control unit 130 also contains input-output circuitry 340 that forms an interface between the various functional elements communicating with the control unit 130. For example, in the embodiment of FIG. 1, the control unit 130 communicates with photodetector 150 via a signal path $S_1$ and to the scanning tunable filter 120 via signal path $O_1$.

Although the control unit 130 of FIG. 3 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Referring back to FIG. 1 and assuming a 5/95 splitting ratio, 5% of the spectrum of an optical signal is tapped off of, for example, a WDM system by the coupler 110 and communicated to the scanning tunable filter 120. The scanning tunable filter 120 filters the input WDM optical signal and communicates the filtered optical signal to the FRM 140. One function of the FRM 140 is to eliminate any polarization sensitivity in the tunable filter 120. The FRM 140 accomplishes this by causing the reflected optical signal to be orthogonally polarized to the polarization of the incoming optical signal. As previously noted though, if the polarization sensitivity of the tunable filter 120 is sufficiently low, then the FRM 140 may be replaced by a plain mirror. In addition and as previously noted, the FRM 140 of FIG. 1 may be replaced by another means of eliminating the polarization sensitivity of an optical signal, such as a quarter-wave plate.

The optical signal is reflected by the FRM 140 and again passes through the scanning tunable filter 120. Once again and as previously noted, the optical signal of the present invention may be directed back to the scanning tunable filter 120 by means, such as a Sagnac loop, other than the FRM 140 of FIG. 1. The second pass of the optical signal through the scanning tunable filter 120 significantly improves the resolution, extinction ratio, and polarization dependence of the optical signal. The optical signal from the scanning tunable filter again passes through the coupler 110 and is communicated to the photodetector 150. The power of the optical signal measured by the photodetector 150 is recorded by the control unit 130 as a function of the optical frequency that the scanning tunable filter 120 was configured to filter. To measure the optical spectrum of the WDM optical signal tapped by the coupler 110, the control unit 130 scans the scanning tunable filter 120 across the band of the WDM optical signal, each time recording the power measured by the photodetector as a function of the optical frequency of that the scanning tunable filter 120 was configured to filter.

To make the optical monitor 100 of FIG. 1 more resistant to wavelength, polarization, and fabrication (WPF) changes and to reduce the loss of the optical monitor 100, the coupler 110 may comprise a novel multi-section optical coupler as described in U.S. patent application Ser. No. 10/378,411 entitled "Low-Loss Integrated Optical Coupler and Optical Switch" filed Mar. 3, 2003, which is herein incorporated by reference in its entirety. Such a multi-section optical coupler is comprised of a plurality of optical couplers substantially equal in length and in one embodiment each comprising a nominal 90° phase shift between their local eigenmodes. As such, and because the plurality of optical couplers are substantially similar, the couplers change in substantially the same manner in the presence of WPF changes, thereby giving the multi-section optical coupler high WPF tolerance. Furthermore, a desired power splitting ratio for the multi-section optical coupler is obtained by adjusting the relative phases of the optical couplers by, in one embodiment, varying the relative path lengths between the waveguides of the waveguides interconnecting the couplers.

Figure 4:
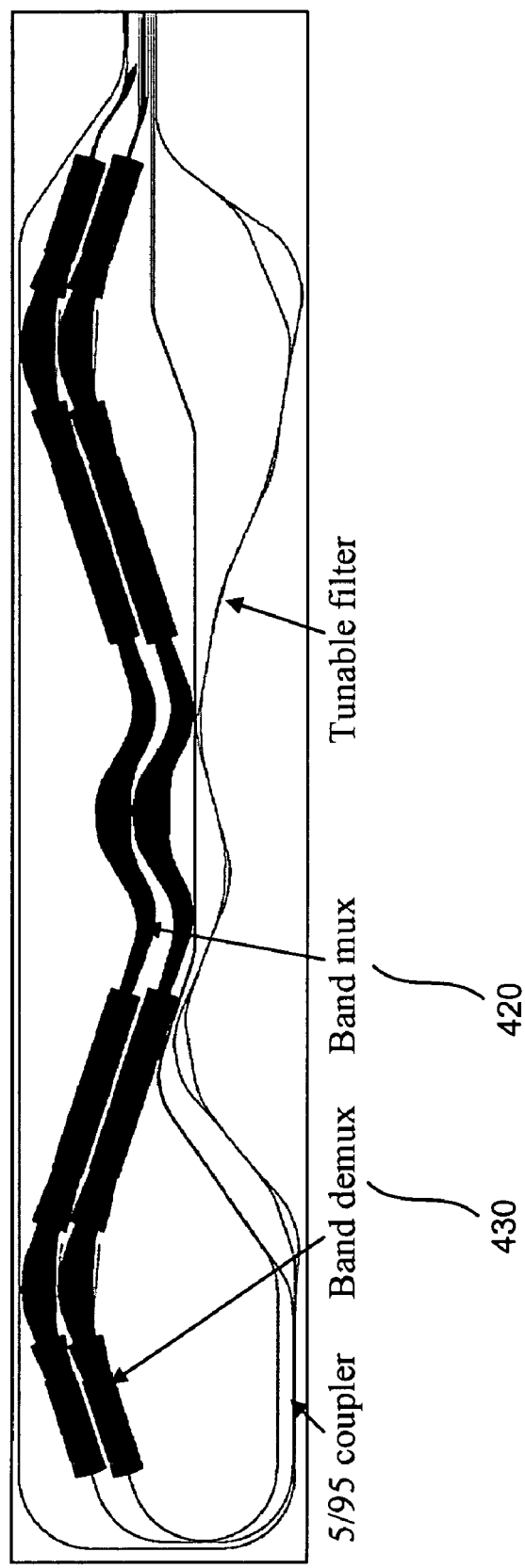
FIG. 4 depicts a high level block diagram of an embodiment of an optical monitor in silica waveguide planar lightwave technology.

In an experiment, the inventor constructed an optical monitor in accordance with the present invention in a silica waveguide planar lightwave circuit (PLC) on a silicon substrate. FIG. 4 depicts a high level block diagram of an embodiment of an optical monitor of the present invention in silica waveguide planar lightwave technology. The optical monitor was integrated along with a band multiplexer 420 and a band demultiplexer 430 on a single PLC chip. The waveguide index step of the PLC chip of FIG. 4 is 0.80%. The tunable filter of FIG. 4 consists of seven coupled thermooptically-tuned MZI filters with an exponential distribution of free-spectral range from 200 to 12800 GHz. To test the monitor three laser lines were launched (two spaced by 100 GHz and one with a considerably larger spacing) into a wavelength add-drop node, constructed using the band demultiplexer 430 and multiplexer 420. The output spectrum of the wavelength add-drop node was then measured with a conventional optical spectrum analyzer and with the embodiment of the optical monitor of the present invention depicted in FIG. 4.

Figure 5:
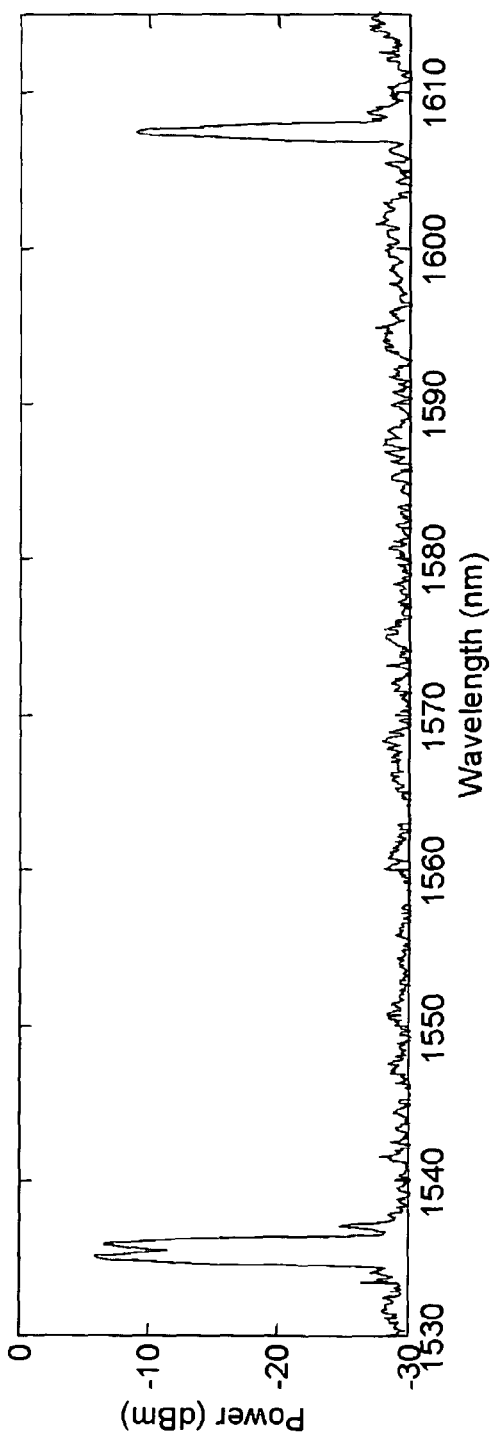
FIG. 5a graphically depicts a spectrum measured by a conventional spectrum analyzer.
FIG. 5b graphically depicts an optical spectrum measured by the optical monitor of FIG. 4.
Figure 5:
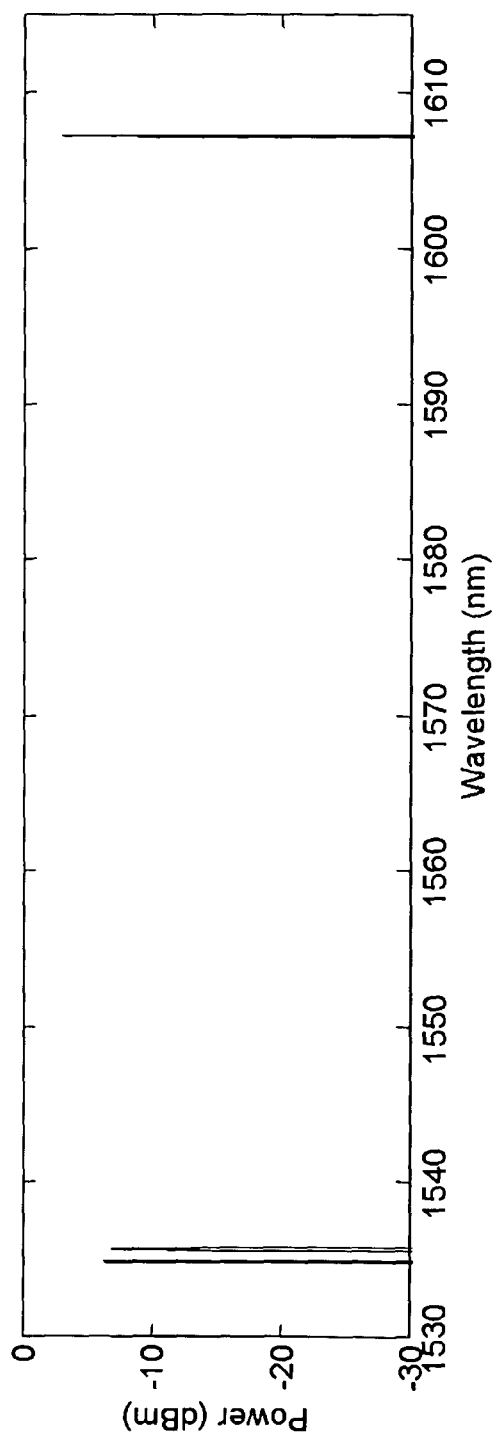

FIG. 5a graphically depicts the spectrum measured by a conventional spectrum analyzer for the experimental parameters described above. In FIG. 5a, the optical powers of the three laser lines are plotted (in dBm) as a function of the wavelength of the laser lines (in nm). FIG. 5b graphically depicts the spectrum measured by the optical monitor of FIG. 4 for the experimental parameters described above. Once again in FIG. 5b, the optical powers of the three laser lines are plotted (in dBm) as a function of the wavelength of the laser lines (in nm). As evident from FIG. 5b, an optical monitor of the present invention is capable of resolving the channel powers on at least a 100-GHz grid.

One advantage of the proposed optical monitor of the present invention is that it is capable of being easily constructed in a planar lightwave circuit (PLC), such as silica waveguides with thermooptic phase shifters. More specifically, the optical coupler and the tunable filter of an optical monitor of the present invention may be integrated into the PLC with the photodetector and the FRM connected either directly to the PLC or by a short piece of fiber. In addition, an optical monitor in accordance with the present invention may be integrated with other PLC-based components, such as a band multiplexer, saving cost, loss, and physical size. The proposed optical monitor is especially suitable for implementation in a PLC because PLCs often have polarization-dependence problems, which are solved in the proposed optical monitor by an FRM.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. An optical monitor, comprising:
   a tunable filter for filtering a tapped portion of an optical signal at a predetermined tuning frequency to provide thereby a first filtered optical signal;
   a directing means for directing the first filtered optical signal back through the tunable filter to provide thereby a second filtered optical signal;
   a photodetector for measuring the power of the second filtered optical signal; and
   a control unit for scanning the tuning frequency of the tunable filter across a frequency band of the optical signal and monitoring the optical power as a function of the tuning frequency.

2. The optical monitor of claim 1, further comprising an optical coupler for tapping a portion of the optical signal and for directing said second filtered optical signal to said photodetector.

3. The optical monitor of claim 2, wherein said optical coupler has associated with it a splitting ratio in range from about 1/99 to about 5/99.

4. The optical monitor of claim 2, wherein said optical couplet comprises a multi-section optical coupler.

5. The optical monitor of claim 1, wherein said directing means comprises a mirror.

6. The optical monitor of claim 1, wherein said directing means comprises a Sagnac loop.

7. The optical monitor of claim 1, wherein said directing means is adapted for reducing polarization dependence of a reflected portion of the first filtered optical signal.

8. The optical monitor of claim 7, wherein said directing means comprises a Faraday rotator mirror.

9. The optical monitor of claim 7, wherein said directing means comprises a quarter-wave plate.

10. The optical monitor of claim 1, wherein the control unit is adapted for tuning said tunable filter across the frequency band of the optical signal.

11. The optical monitor of claim 1, wherein said tunable filter comprises a plurality of coupled Mach-Zehnder Interferometer filters.

12. The optical monitor of claim 11, wherein each of said Mach-Zehnder Interferometer filters comprises at least one phase shifter.

13. The optical monitor of claim 11, wherein said tunable filter comprises seven coupled Mach-Zehnder Interferometer filters.

14. The optical monitor of claim 1, wherein said tunable filter comprises an exponential distribution of a free-spectral range from 200 to 12800 GHz.

15. A method of monitoring an optical signal, comprising:
   a) filtering a tapped portion of the optical signal at a predetermined tuning frequency using a frequency tunable filter to provide thereby a first filtered optical signal;
   b) reflecting the first filtered optical signal back through the tunable filter to provide thereby a second filtered optical signal;
   c) determining the power of the second filtered optical signal as a function of the tuning frequency of the frequency tunable filter; and
   d) repeating steps a) through c) throughout a frequency band of the optical signal to determine an optical spectrum of the optical signal.

16. An optical monitor, comprising:
   a first means for tapping a portion of an optical signal;
   a frequency tunable means for filtering a tapped portion of an optical signal at a predetermined frequency to provide thereby a first filtered optical signal;
   a second means for reflecting the first filtered optical signal back through the frequency tunable means and the first means to provide thereby a second filtered optical signal;
   a third means for measuring the optical power of the second filtered optical signal; and
   a fourth means for scanning the tuning frequency of said tunable means across a frequency band of the optical signal and for monitoring the optical power as a function of the tuning frequency.

17. The optical monitor of claim 16, wherein the second means is adapted for reducing polarization dependence of a reflected portion of the first filtered optical signal.

* * * * *